United States Patent [19]
Oh

[11] Patent Number: 6,099,046
[45] Date of Patent: Aug. 8, 2000

[54] CONNECTOR FOR METAL RIBBED PIPE

[75] Inventor: Seung-Il Oh, 222-508 Mokdongshinsigaji Apt., 902, Mok 6-Dong, Yangcheon-Ku, Seoul, Rep. of Korea

[73] Assignee: Seung-Il OH, Seoul, Rep. of Korea

[21] Appl. No.: 09/176,036

[22] Filed: Oct. 21, 1998

[51] Int. Cl.[7] .................................................. F16L 17/00
[52] U.S. Cl. ............................ 285/354; 285/353; 285/903
[58] Field of Search ..................................... 285/903, 353

[56] References Cited

U.S. PATENT DOCUMENTS

| | | | |
|---|---|---|---|
| 4,437,691 | 3/1984 | Laney | 285/353 |
| 4,674,775 | 6/1987 | Tajima | 285/903 |
| 4,801,158 | 1/1989 | Gomi | 285/903 |
| 4,904,002 | 2/1990 | Sasa | 285/903 |
| 5,713,607 | 2/1998 | Webb . | |
| 5,746,454 | 5/1998 | Webb . | |
| 5,799,834 | 9/1998 | Small et al. . | |
| 5,806,166 | 9/1998 | Fuser . | |
| 5,857,716 | 1/1999 | Thomas | 285/903 |

*Primary Examiner*—Lynne H. Browne
*Assistant Examiner*—Aaron Dunwoody
*Attorney, Agent, or Firm*—Jones, Day, Reavis & Pogue

[57] ABSTRACT

A connector for a metal ribbed pipe comprises a ribbed pipe, an adapter having a protrusion and connecting with a fluid receiving apparatus, a plurality of inserts having a recess contacting to the protrusion and having a collar opposite to the recess, a sleeve fitted on the collar, and a nut for assembling the sleeve with the adapter. Due to the close contact between the protrusion and the recess, the connecting end of the ribbed pipe flares in to achieve a tight seal.

1 Claim, 5 Drawing Sheets

6,099,046

1

CONNECTOR FOR METAL RIBBED PIPE

BACKGROUND OF THE INVENTION

1. Field of the Invention

This invention relates to a connector for a metal ribbed pipe, more particularly a connector for a metal ribbed pipe having a plurality of inserts being encompassed by a sleeve housed in a nut.

2. Prior Art

A sealable connector is required for a ribbed pipe through which high temperature or high pressure fluid flows in order to connect to a fluid receiving apparatus. A conventional connector for a metal ribbed pipe to satisfy this need is shown in FIGS. 4 and 5.

As shown in these Figures, the connector for a metal ribbed pipe comprises an adapter 100 connecting a fluid receiving apparatus which is not shown, a ribbed pipe 500 inserted into a second through hole 310 of a nut 300, and a pair of ferrules 810A, 810B, 830A, 830B housed in the nut 300 and mounted on the ribbed pipe 500 adjacent to a connecting end 510 of the ribbed pipe 500. The connector for the metal ribbed pipe further comprises a rubber seal 900 arranged between the connecting end 510 and a flat portion 110 formed at a circumference of a fluid flow channel 130 of the adapter 100 to prevent the fluid from leaking from a connecting portion between the adapter 100 and the nut 300.

The assembly of the conventional connector for a metal ribbed pipe configurated above will be made as follows: A pair of ferrules 810A, 810B, 830A, 830B are placed on the ribbed pipe 500. The nut 300 moves along the ribbed pipe 500 toward the adapter 100, and couples by being threaded with the adapter 100. The ferrules 810A, 810B, 830A, 830B press the connecting end 510 of the ribbed pipe 500 with the further rotation of the nut 300. The connecting end 510 pushes the rubber seal 900, thereby completing the assembly.

To assemble the nut 300 with the adapter 100, a worker holds the ferrules 810A, 810B, 830A, 830B mounted on the ribbed pipe 500 by one hand, and rotates the nut 300 by another hand. However, during the assembly process, the ferrules 810A, 810B, 830A, 830B drop off the ribbed pipe 500, which leads to inconvenience during assembly work.

Further, if high temperature fluid flows through the ribbed pipe 500, the efficient functioning of the rubber seal 900 declines over long term use.

Furthermore, if the fluid in the ribbed pipe 500 has a poisonous component, the use of the rubber seal 900 is nearly impossible.

THE SUMMARY OF THE INVENTION

The object of this invention is to provide a connector for a metal ribbed pipe for solving the above problems.

Another objective of this invention is to provide a connector for a metal ribbed pipe to eliminate the possiblity of dropping of a ferrule from a ribbed pipe during assembly of an adapter with a nut.

Another objective of this invention is to provide a connector for a metal ribbed pipe for extending the durability of a metal ribbed pipe as well as a connector for a metal ribbed pipe even when the transfer of poisonous fluid occurs.

To obtain these objectives, a connector for a metal ribbed pipe comprises a ribbed pipe for supplying fluid, an adapter having a fluid flow channel therein and connecting to an apparatus into which the fluid is supplied, a plurality of

2 inserts mounted on an outside surface of a connecting end of the ribbed pipe and having a collar respectively, a sleeve placed around the ribbed pipe and fitting on an outside diameter of each collar of the insert, and a nut for assembling the sleeve with the adapter.

Further, the adapter has a protrusion around the fluid flow channel, and the insert has a recess which is shaped to correspond with the protrusion of the adapter for closely contacting with the protrusion of the adapter.

Furthermore, the connecting end of the ribbed pipe flares in due to the close contact between the protrusion of the adapter and the recess of the insert during assembly of the adapter with the nut.

BRIEF DESCRIPTION OF THE DRAWINGS

This invention will be better understood and its various objects and advantages will be more fully appreciated from the following description taken in conjunction with the accompanying drawings, in which.

DETAILED DESCRIPTION OF THE PREFERRED EMBODIMENT

Hereinafter, this invention will be described in detail with reference to the drawings.

Figure 1:
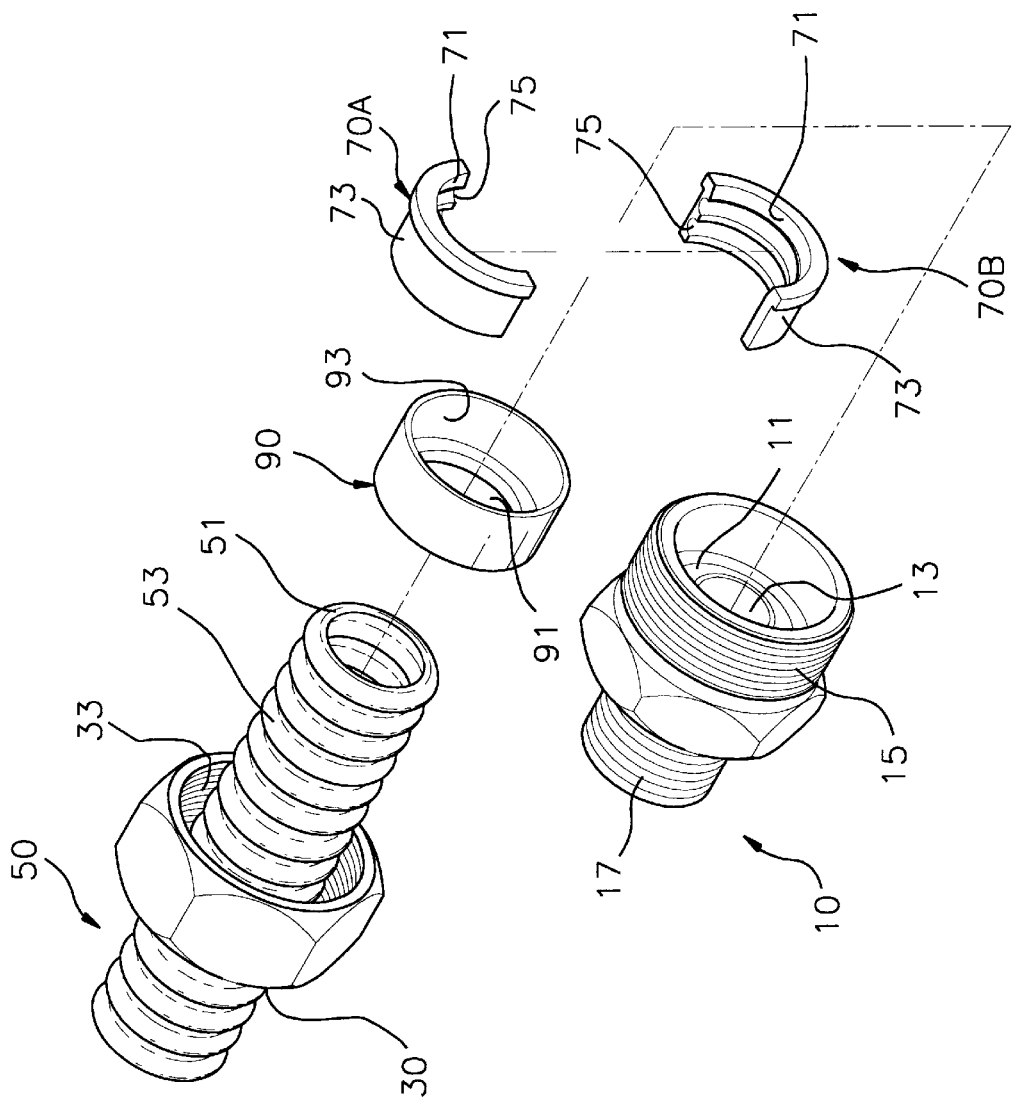
FIG. 1 is an exposed perspective view of a connector for a metal ribbed pipe according to a present invention.

FIG. 1 shows a connector for a metal ribbed pipe according to the present invention.

The connector for a metal ribbed pipe comprises a ribbed pipe 50 for supplying fluid, an adapter 10 for connecting to an apparatus into which the fluid is supplied, and a nut 30 for assembling the ribbed pipe 50 with the adapter 10.

The connector for a metal ribbed pipe further comprises a plurality of inserts 70A,70B and a sleeve 90 which are housed in the nut 30 and enable the nut 30 to be sealingly assembled with the adapter 10.

The adapter 10 comprises a fluid channel 13 formed in the adapter 10 for supplying the fluid through the ribbed pipe 50 toward the fluid receiving apparatus (not shown), a second male thread portion 17 narrowing down as it extends toward the non-shown fluid receiving apparatus and connecting to the fluid receiving apparatus (not shown) directly, or indirectly via another adapter (not shown). The adapter 10 further comprises a first male thread portion 15 provided opposite to the second male thread portion 17 and coupling with the nut 30. The adapter 10, furthermore, comprises an annular protrusion 11 formed around the circumference of the fluid flow channel 13 which is adjacent to the inside of the first male thread portion 15 and enabling a recess 71 of the insert 70a,70B which will be illustrated later to be contacted.

The nut 30 comprises a second through hole 31 which is formed at a center of the nut 30 and through which the ribbed pipe 50 is inserted, and a female thread portion 33 that is coupled by being thread with the first male thread portion 15 of the adapter 10.

A pair of inserts 70A,70B are shaped in a half-circle, respectively. Each insert 70A,70B has a groove 75 at the inner circumference of the insert 70A,70B which is placed on a rib 53 of the ribbed pipe 50. Moreover, each insert 70A,70B has a recess 71 at the portion facing the protrusion 11 of the adapter 10 with a complimentary shape having a shape of the protrusion 11. Furthermore, the recess 71 has a collar 73 at the rear outer circumference of each insert 70A,70B which is opposite to a front portion, where the recess 71 is formed, of each insert 70A,70B.

The sleeve 90 comprises a first through hole 91 which is formed at a center of the sleeve 90 and through which the ribbed pipe 50 is inserted, and an annular flange 93 enabling each collar 73 of the assembled insert 70A,70B to be inserted into the inner circumference of the annular flange 93.

The ribbed pipe 50 comprises a connecting end 51 which contacts with the protrusion 11 of the adapter 10, and a plurality of ribs 53 formed along the entire pipe.

Figure 2:
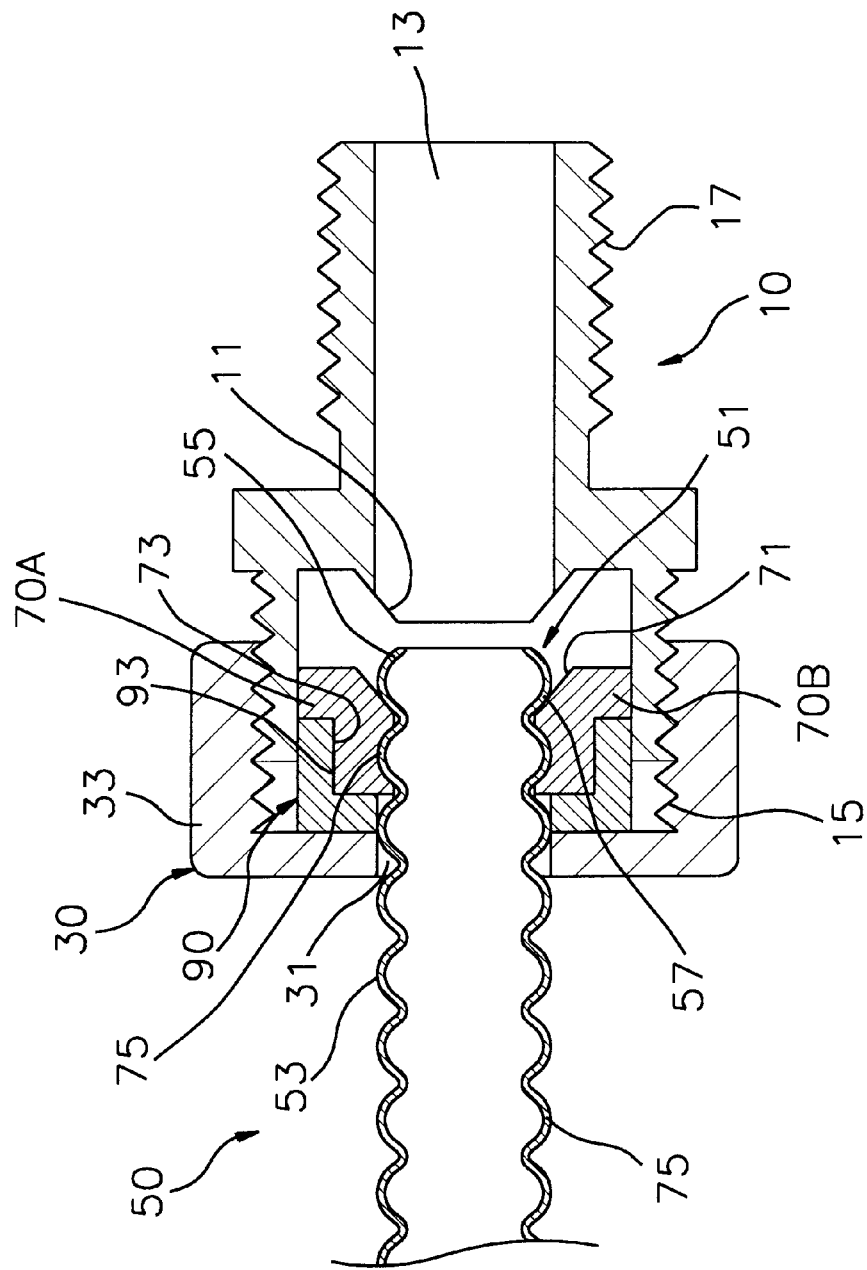
FIG. 2 is a cross sectional view showing the inside arrangement of the connector at the preassembly stage according to the present invention.

An assembly of the inventive connector for the metal ribbed pipe is achieved as follows:

FIG. 2 shows the connector for a ribbed pipe in the preassembly step. The ribbed pipe 50 is introduced into the second through hole 31 of the nut 30. Since the diameter of the second through hole 31 of the nut 30 is slightly larger than the outer diameter of the rib 53 of the ribbed pipe 50, the nut 30 freely moves along the entire pipe. Following the nut 30, the connecting end 51 of the ribbed pipe 50 is introduced into the first through hole 91 of the sleeve 90. Since the diameter of the first through hole 91 of the sleeve 90 is slightly larger than the outer diameter of the rib 53 of the ribbed pipe 50, the sleeve 90 also freely moves along the entire pipe.

Each insert 70A,70B is placed on the rib 53 of the ribbed pipe 50 through which the sleeve 90 and the nut 30 are inserted already. The recess 71 of each insert 70*a*,70B comes into contact with the outer circumference of the connecting end 51 of the ribbed pipe 50.

The sleeve 90 which freely moves along the ribbed pipe 50 moves toward the connecting end 51 of the ribbed pipe 50. The inner circumference of the annular flange 93 of the sleeve 90 encompasses the collar 73 of each insert 70A,70B. Since the outer diameter of the collar 73 is slightly larger than the inner diameter of the annular flange 93, the sleeve 90 is forcedly fitted with the collar 73 of the assembled insert 70*a*,70B.

Figure 3:
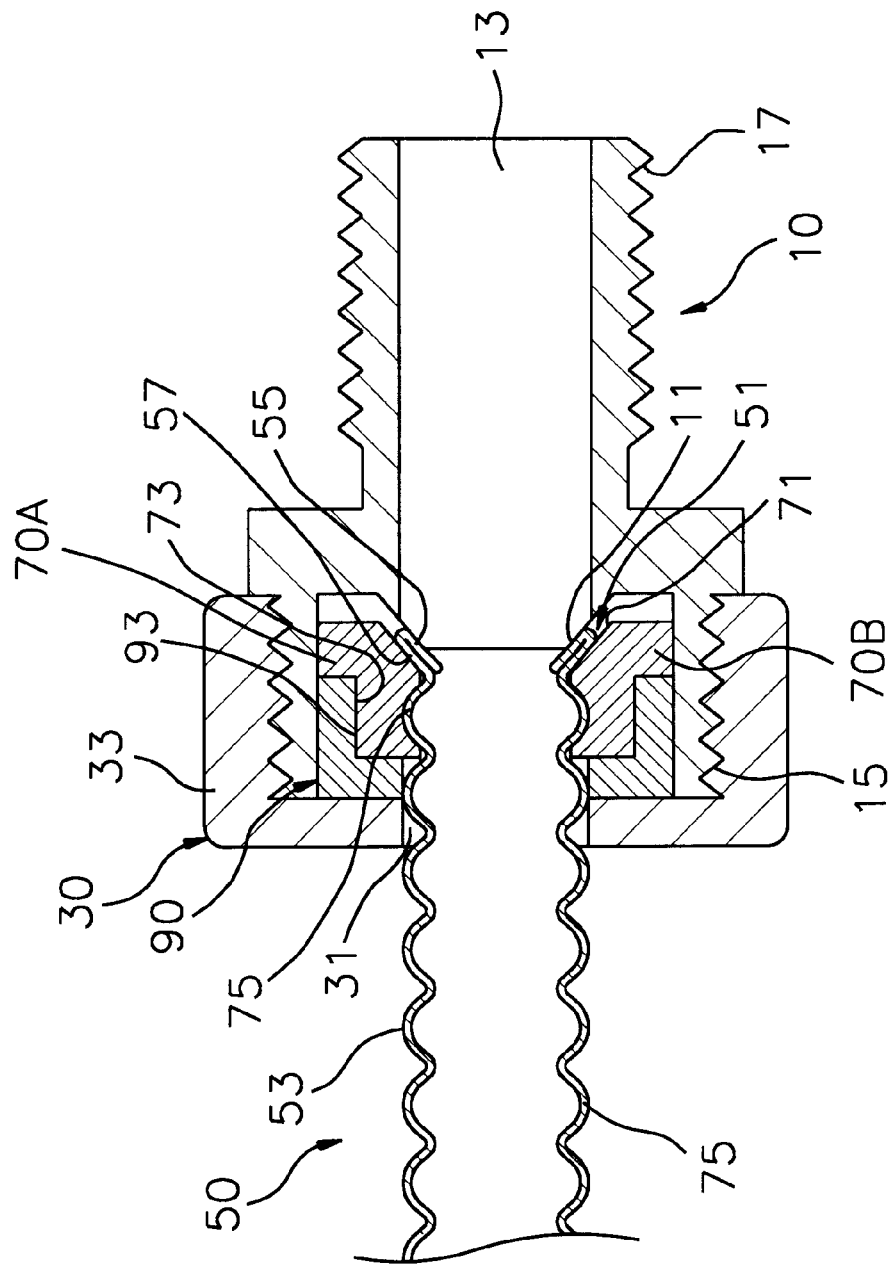
FIG. 3 is a cross sectional view showing the inside arrangement of the connector at the tight assembly stage according to the present invention.
Figure 4:
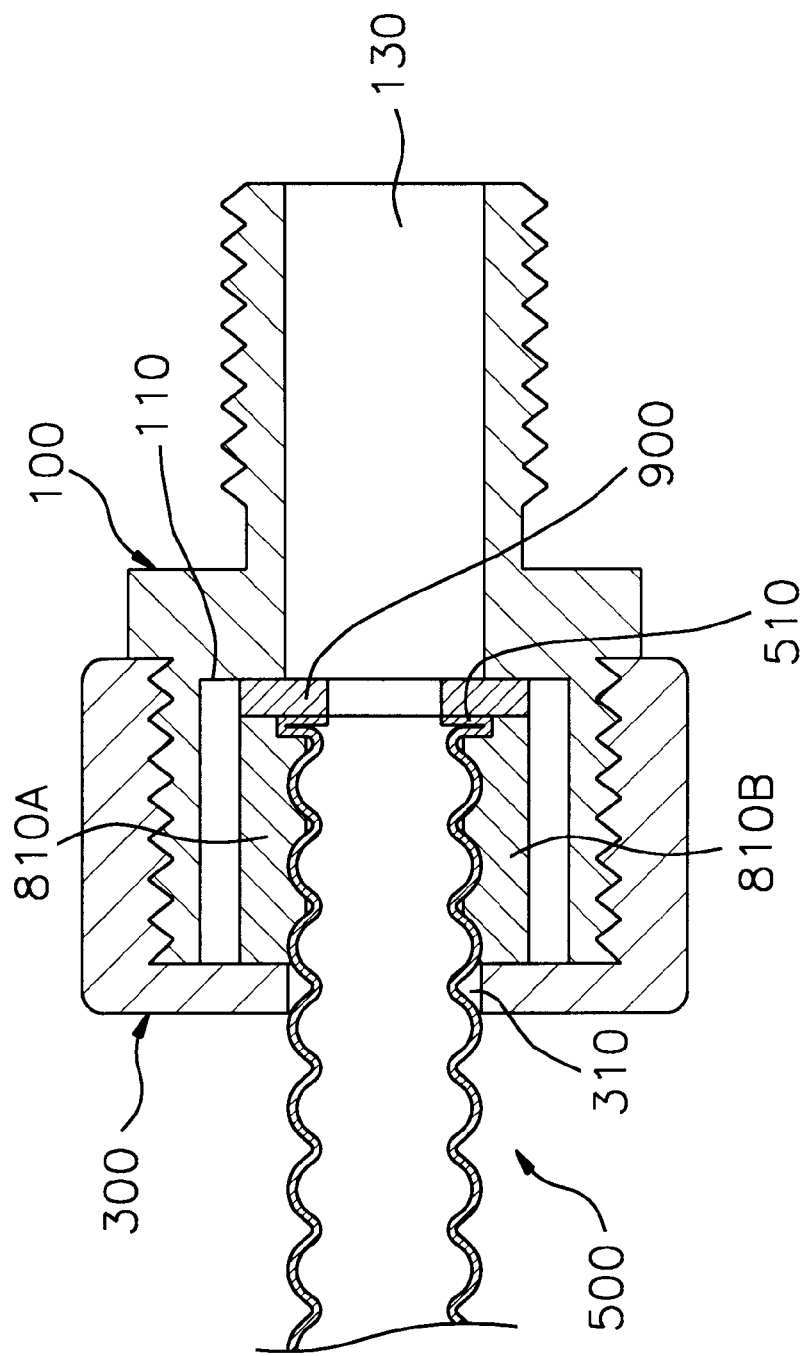
FIG. 4 is a cross sectional view showing the inside arrangement of the conventional connector according to one embodiment.
Figure 5:
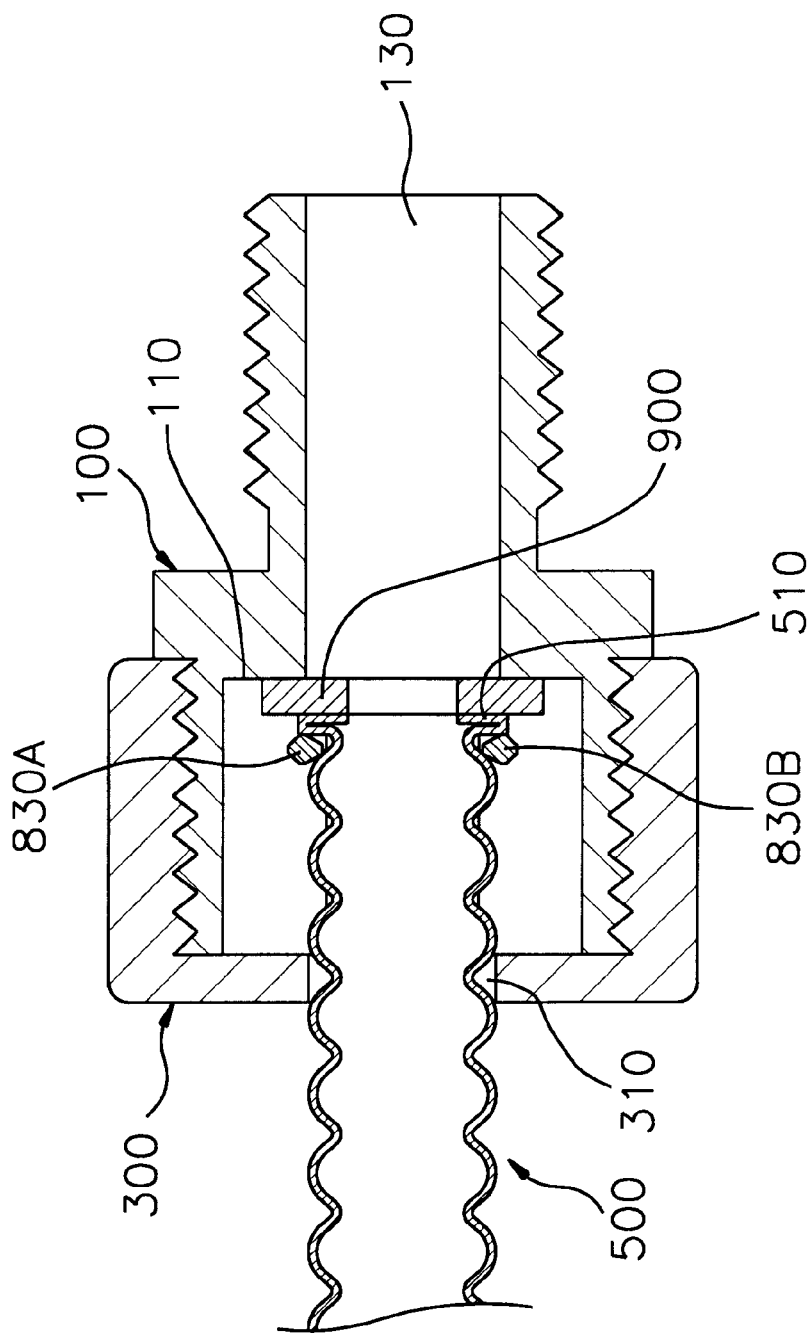
FIG. 5 is a cross sectional view showing the inside arrangement of the conventional connector according to another embodiment.

FIG. 3 shows circumferential edge 55 of the connecting end 51 of the ribbed pipe 50 comes into contact with the protrusion 11 of the adapter 10. The nut 30 is thread with the first male thread portion 15 of the adapter 10. With the further rotation of the nut 30, the sleeve housed in the nut 30 pushes each insert 70A,70B toward the adapter 10. The recess 71 of each insert 70A,70B pushes a sloped portion 57 of the ribbed pipe 50 toward the protrusion 11 of the adapter 10. The sloped portion of the ribbed pipe 50 is formed next to the connecting end 51 of the ribbed pipe 50 toward the body of the ribbed pipe 50. Simultaneously, the circumferential edge 55 of the ribbed pipe 50 flares in upon contact with the protrusion 11 of the adapter 10. With the further rotation of the nut 30, the outside surface of the connecting end 51 of the ribbed pipe 50 attains a sealed contact with the protrusion 11 of the adapter 10, while the inside surface of the connecting end 51 is deformed adjacently by facing the slope portion 57 of the ribbed pipe 50.

Since a pair of inserts are mounted on the rib of the ribbed pipe and fixedly coupled by the sleeve, and only the nut moves toward the adapter to be thread and coupled with the adapter, the ribbed pipe can speedily and properly be assembled with the adapter unless the insert drops from the ribbed pipe.

Further, since there is no need to employ a rubber seal which is provided between the ribbed pipe and the adapter for maintaining a seal, the connector for a metal ribbed pipe can be used to transfer even poisonous fluid with durability.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A connector for a metal ribbed pipe comprising:

a ribbed pipe for supplying fluid;

an adapter having a fluid flow channel therein and having a protrusion around said fluid flow channel and connecting with an apparatus into which the fluid is supplied;

a plurality of inserts mounted on an outside surface of a connecting end of said ribbed pipe and having a collar, respectively, each of said inserts having a recess which is shaped to correspond with said protrusion of said adapter for closely contacting with said protrusion of said adapter;

a sleeve placed around said ribbed pipe, said sleeve has a first through hole which is formed at a center thereof and through which the ribbed pipe is inserted and an annular flange enabling each collar of the inserts being assembled to be inserted into the inner circumference of the annular flange, for being forcedly fitted with said collar of said inserts being assembled and fitting on an outside diameter of each collar of said inserts; and a nut for assembling said sleeve with said adapter.

* * * * *